No. 653,377. B. J. COBLEIGH. Patented July 10, 1900.
BUTTON FASTENER.
(Application filed Sept. 5, 1899.)
(No Model.)

WITNESSES:
Harry King.
S. M. McColl.

INVENTOR
B. J. Cobleigh
BY J. C. Somes
ATTORNEY

UNITED STATES PATENT OFFICE.

BENNETT J. COBLEIGH, OF KINGSTON, PENNSYLVANIA.

BUTTON-FASTENER.

SPECIFICATION forming part of Letters Patent No. 653,377, dated July 10, 1900.

Application filed September 5, 1899. Serial No. 729,490. (No model.)

*To all whom it may concern:*

Be it known that I, BENNETT JAMES COBLEIGH, a citizen of the United States of America, residing at Kingston, in the county of Luzerne, in the State of Pennsylvania, have invented certain new and useful Improvements in Button-Fasteners, of which the following is a specification.

This invention relates to button-fasteners for securing buttons to boots, shoes, and other articles of apparel.

The object of the invention is to provide a button-fastener which may be readily applied to the article of apparel and of such construction that the button can be easily inserted in the fastener after the application thereof to the fabric without interference of the fabric therewith.

This invention consists in a button-fastener comprising a base-plate and a shank extending therefrom, said shank being provided with an eye for holding the shank of the button and with an entrance-slot extending from said eye to the outer edge of the shank and inclined away from the base-plate, whereby when the fastener is applied to the fabric the mouth of said entrance-slot will be disposed near the surface thereof to facilitate the insertion of the button. The shank may be sharp at its outer end to facilitate its passage through the cloth, or it may have a blunt outer end covered with a detachable socketed needle.

Figure 1:
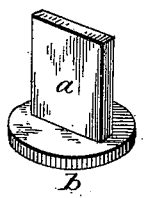
Figure 2:
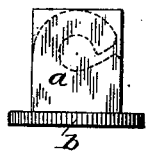
Figure 3:
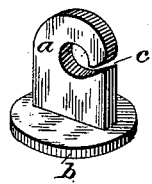
Figure 4:
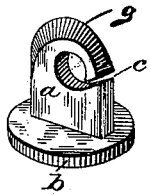
Figure 5:
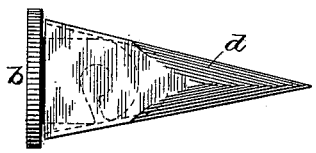
Figure 6:
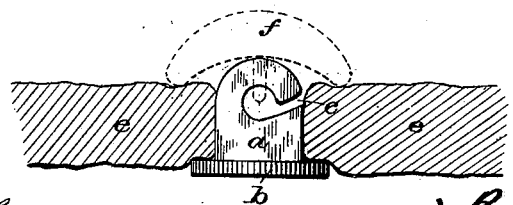

Figure 1 of the accompanying drawings represents an enlarged perspective view of a metal blank out of which this improved fastener may be formed. Fig. 2 represents an enlarged elevation thereof, the shank of the fastener being indicated in dotted lines. Fig. 3 represents an enlarged perspective view of the fastener provided with a blunt shank. Fig. 4 represents an enlarged perspective view of the fastener provided with a sharpened shank. Fig. 5 represents an enlarged side elevation of a fastener having a blunt shank and provided with a detachable socketed needle disposed over said shank to facilitate the insertion thereof in the fabric. Fig. 6 represents an enlarged section of a piece of fabric and an enlarged side elevation of this button-fastener inserted therein, showing a button in dotted lines engaged by said fastener.

Similar letters of reference indicate corresponding parts in all the figures.

This button-fastener comprises a base-plate $b$ and a shank $a$, attached thereto and preferably integral therewith. The shank $a$ is preferably rounded at its outer end, and said outer end may be blunt, as shown in Fig. 3, or provided, as shown in Fig. 4, with a sharpened edge $g$, adapted to cut a slit in the fabric for the insertion of the fastener. The shank $a$ is provided with an eye $h$ for holding the shank $i$ of the button $f$ and with a slot $c$, which serves as a passage to said eye. The slot $c$ is inclined outward away from the base-plate or toward the button when the latter is applied to the fabric and preferably connected with said eye at the lower part of the latter. This inclination of the slot generally brings the outer end or mouth thereof near the upper edge of the fabric to which the fastener is applied, whereby the shank of the button may be easily inserted in the slot, and a simple downward lateral pressure on the button will cause its eye to slide into its place in the eye of the shank. This is of especial advantage when the fabric is composed of leather or other comparatively-stiff goods or when it is very thick.

In the manufacture of the fastener the blank shown in Fig. 1 may be made by machinery by a process similar to that of making a rivet. The shank $a$ is then punched or struck out from the square part of the blank and bears the outwardly-inclined slot $c$ and the eye $h$ at the inner end thereof.

In the use of a button-fastener similar to that shown in Fig. 3 the shank $a$ is inserted in the fabric in any suitable manner, so that the base-plate $b$ rests against the back or under side thereof. This insertion is preferably made through stiff or heavy fabric by means of a detachable socketed needle $d$ in the form of a pointed cap, which shuts down over the shank $a$ into contact with the base $b$ and completely covers said shank. The pointed end of said needle or cap is then passed through the fabric, as $e$, until the base-plate $b$ comes in contact with the under side of said fabric. Then said cap is pulled off from the button-fastener, and the mouth of the slot *c* is found to be adjacent to the inner face of the fabric. Then the shank *i* of the button *f* is readily passed into and through said slot to the eye *h* at the inner end thereof and is held in place by the hook-shaped form of the outer end of the shank.

In applying the button-fastener shown in Fig. 4 the cap or socketed needle *d* may be dispensed with. The sharpened edge *g* of said shank may be utilized in applying the fastener to the fabric, said sharp edge readily severing the fabric to admit the shank. After this application of this form of fastener through the fabric the button may be applied to the fastener in the manner already described.

The fastener may be made of steel, brass, or any other suitable material.

The advantages of this fastener are its simplicity of construction and the facility with which the fastener may be applied to the fabric and the button adjusted in the fastener.

I claim as my invention—

A button-fastener comprising a base-plate and a shank attached thereto, said shank being provided with an eye adapted to receive the shank of a button and with an entrance-slot extending from said eye to the outer edge of the shank and inclined away from said base-plate, whereby when the fastener is applied to the fabric, the mouth of said entrance-slot will be near the surface of said fabric to facilitate the insertion of the button in the fastener.

In witness whereof I have hereunto set my hand in the presence of two witnesses.

B. J. COBLEIGH.

Witnesses:
ELLIOTT R. MORGAN,
J. P. DAVIES.